March 30, 1965 J. N. BÉJAT ETAL 3,176,153

MESA-TYPE FIELD-EFFECT TRANSISTORS
AND ELECTRICAL SYSTEM THEREFOR

Filed Sept. 15, 1961 3 Sheets-Sheet 1

3,176,153

MESA-TYPE FIELD-EFFECT TRANSISTORS AND ELECTRICAL SYSTEM THEREFOR

Jean N. Bejat, 4 Rue Antoine Petit, Fontenay-aux-Roses, France; Paul Durand, 186 Quai de Stalingrad, Issy-les-Moulineaux, France; Jean P. Girard, 12 Rue Auber, Nice, France; Marc E. Savelli, 7 Rue Emile Zola, Fontenay-le-Fleury, France; Marc A. Chappey, 27 Ave. Raymond Poincare, and Georges Tsoucaris, 125 Blvd. Saint-Michel, both of Paris, France; Alice L. Soula, 42 Ave. du General Leclerc, Bourg-la-Reine, France; and Jean R. Delmas, 44 Rue de la Republique, Vanves, France Filed Sept. 15, 1961, Ser. No. 138,396
Claims priority, application France Sept. 10, 1960
4 Claims. (Cl. 307—88.5)

Figure 1:
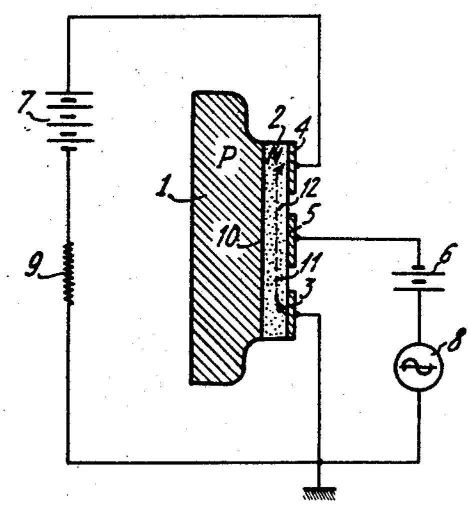

The present invention concerns field-effect semiconductor devices and, more particularly, such devices of the so-called mesa type and the method of producing the same.

It will be remembered that a mesa-type field-effect transistor essentially comprises a semiconductor plate of a given type of conductivity, a layer of the opposite type of conductivity diffused onto one of the faces of said plate, two ohmic contacts located on said diffused layer and, between these ohmic contacts, a rectifying electrode constituting the gate of the field-effect transistor. A space charge is produced between this rectifying electrode and the junction between the plate and the diffused layer. In that case, a space-charge barrier will appear when the junction is reverse-biased. If the thickness of the diffused layer between the junction and the rectifying electrode is $w$, the voltage required to push the barrier completely across the region is given, as is well known, by an appropriate solution to the one-dimensional Poisson equation with charge density $P_f$. This voltage is referred to as the "pinch-off" voltage and is given by:

$$v_f = \int \frac{P_f}{K} w dw$$

or, if the charge density and the dielectric constant may be considered as constants, by:

$$V_f = P_f w^2 / 2K$$

The field-effect transistor current is then limited by the punch-trough phenomenon and the value of the limiting or saturation current for high applied voltages has been developed by G. C. Dacey in an article, "Space-Charge Limited Hole Current in Germanium," published in the Physical Review, vol. 90, number 5, June 1, 1953, pages 759–763.

Mesa-type field-effect transistors have also been proposed in which the rectifying electrode located between the source and drain electrodes is omitted; the space-charge region extends from the junction up to the outer surface of the plate. French Patent No. 1,195,298 filed December 11, 1957, for example discloses a mesa transistor of said kind. It comprises a semiconductor plate, a gate ohmic electrode on one side of this plate, a diffused layer on the other side and on said diffused layer, source and drain electrodes and a groove contrived therebetween. A space charge is produced between the junction and the bottom of the groove when the gate electrode is biased in the reverse direction.

The mesa structures of the prior art just above referred to in which the space charge is not bounded by two junctions but by a junction and a clear surface exhibit a plurality of drawbacks. A first difficulty results from the fact that the diffused layer has a smaller resistivity than does the plate and that the resistivity gradient increases from the outer surface of the diffused layer up to the junction. In fact, in order that the space charge produced from the junction preferably extends in the diffused layer towards the surface of the same rather than towards the interior of the plate, it is necessary that the diffused layer have a higher resistivity than does the plate and, in order that the ratio between the extension of the space charge and the junction potential would remain nearly linear, it is necessary that the resistivity gradient increase from the junction in the direction of the surface of the diffused layer. The conditions for proper functioning of transistors of the type here considered with regard to the relative resistance of the plate and the diffused layer and also with regard to the direction of variation of resistivity as a function of the thickness are opposite to those which generally prevail for the diffused transistors of the prior art.

A second difficulty arises from the fact that pinch-off cannot be made complete due to the limitation of the space-charge region by the clear surface of the plate and, consequently, current-voltage curves having a marked saturation knee cannot be obtained.

One object of the invention is to produce mesa-type field-effect transistors having a layer diffused onto a semiconductor plate comprising only two ohmic electrodes and no junction except that formed by the diffused layer.

A further object of the invention is to produce mesa-type field-effect transistors having a layer diffused onto a semiconductor plate comprising two ohmic electrodes located on said diffused layer, in which saturation voltages have rather small values.

A further object of the invention is to produce mesa-type field-effect transistors in which the saturation voltage depends both upon the size of the gap between the source and drain electrodes and the thickness of the diffused layer.

A further object of the invention is a method for fabricating mesa-type field-effect transistors in which the diffused layer has a resistivity greater than that of the plate and a resistivity gradient increasing from the junction of the diffused layer in the direction of its surface and in which the source and drain electrodes are spaced apart by a gap substantially equal to the thickness of the diffused layer.

In the mesa-type field-effect transistors of the invention, saturation is due both to pinch-off and to the fact that the gap between source and drain is determined so that the mobile conduction carrier drift velocity reaches its limiting value for a voltage substantially equal to the pinch-off voltage.

In the prior art, the reduction of the thickness of the channel, i.e., of the diffused layer, was considered as a more important point than the reduction of the source-drain gap, since it was believed that the saturation of a transistor of the type concerned was due to complete pinch-off. It results from applicants' experiments that the source-drain gap is a worthier parameter than the thickness of the channel. More specifically, the cause of saturation due to the carrier limiting drift velocity must cooperate with the cause of saturation due to pinch-off.

It is known that the rate of increase of the average drift velocity of carriers or mobility decreases in high electric fields and that said velocity becomes constant when a so-called critical field value is reached.

The existence of this critical field has been known for a long time; notably, it was pointed out by E. J. Ryder in an article entitled "Mobility of Holes and Electrons in High Electric Fields," appearing in "Physical Review" vol. 90, No. 5, June 1953, page 766. Under the influence of the critical field, the carrier velocity reaches a limiting value. The curve representing the carrier velocity as a function of the electric field has three parts. The first beginning at the origin is substantially a straight line because, for the small values of the field, the potential difference and the current follow Ohm's law and the mobility is then the constant low-field velocity. The second part substantially is a parabola of which the concavity is oriented towards the abscissa. The carrier velocity substantially increases as the square root of the electric field. The third part of the curve is very nearly parallel to the abscissa, showing that the carrier velocity increases very little with an increasing electric field because it has attained a limiting value which depends upon the nature of the semiconductor. The critical field is herein defined as the value of the field at the transition between the second and third parts (and not at the transition between the first and second parts as often defined).

For obtaining the saturation of the transistor current due to the limitation of the drift velocity for a given small voltage, it is necessary to separate the source and the drain by a distance such that, for said voltage, the electric field has at least the critical value. More precisely, the field which accelerates the mobile carriers and the field which develops the space-charge are substantially perpendicular, and substantially equal for a zero gate voltage. The pinch-off field $E_0$ may be deduced from the pinch-off voltage given above and is equal to $$E_0=P_f w/K$$

($K$=dielectric constant)
The critical field $E_1$ is given by $$E_1=P_f l/K$$

where $l$ is the width of the source-drain gap. In order for the critical field to be attained before the pinch-off field, one must have $l>w$ In fact, experiments have given good results both with regard to the transconductance value and the saturation voltage value when $l$ and $w$ are chosen substantially equal.

If one takes for the carrier mobility, the critical electric field and the limit drift velocity in germanium and silicon the following data which are published in the textbook of Ivey, "Advances in Electronic Physics," vol. VI, page 245, Academic Press, New York:

| Semiconductor | Type | Mobility, cm.²/V. sec. | Critical field, V/cm. | Limiting Drift velocity, cm./sec. |
|---|---|---|---|---|
| Germanium | N | 3.900 | 3.300 | 6.10 ⁶ |
| | P | 1.000 | 8.000 | |
| Silicon | N | 1.200 | 17.000 | 9.10 ⁶ |
| | P | 370 | 62.000 | |

the following typical values for $l$ and $w$ may be given.
If $$P_f=6.4\ 10^{-6}\ \text{coulombs/cm.}^3$$
$$K=1.42\ 10^{-12}\ \text{farads/cm.}$$
$$E_1=3.300\ \text{V/cm.}$$

then $$l\cong 7\mu$$

(for N-type germanium)
If $$P_f=1.38\ 10^{-5}$$
$$K=1.06\ 10^{-12}\ \text{farads/cm.}$$
$$E_1=17.000\ \text{V/cm.}$$

then $$l\cong 12\mu$$

(for N-type silicon)

Figure 2:
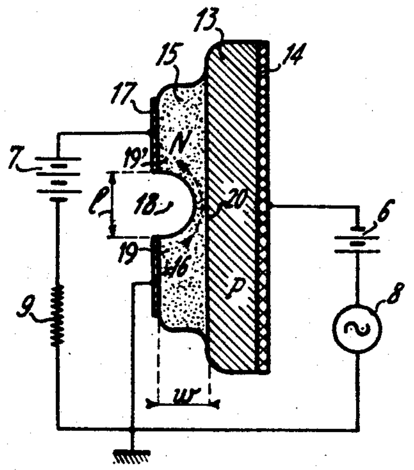
Figure 3A:
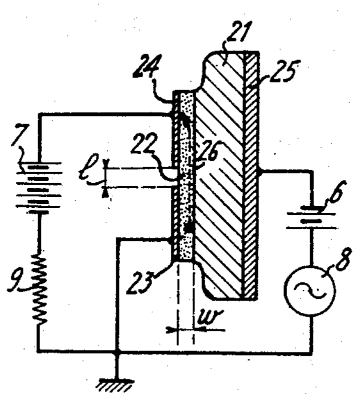
Figure 3B:
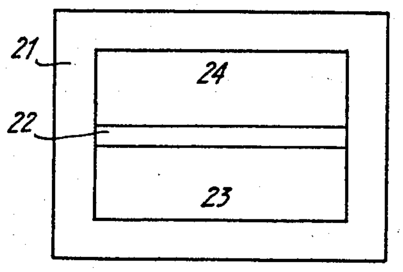
Figure 5A:
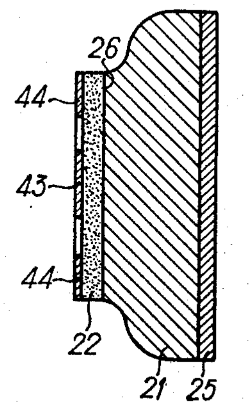
Figure 5B:
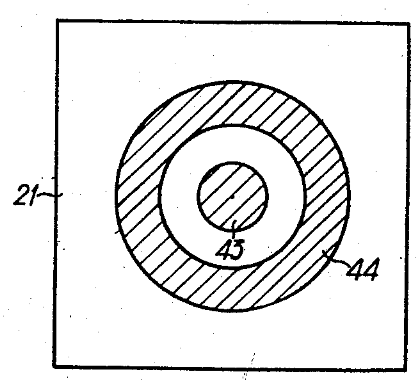
Figure 4:
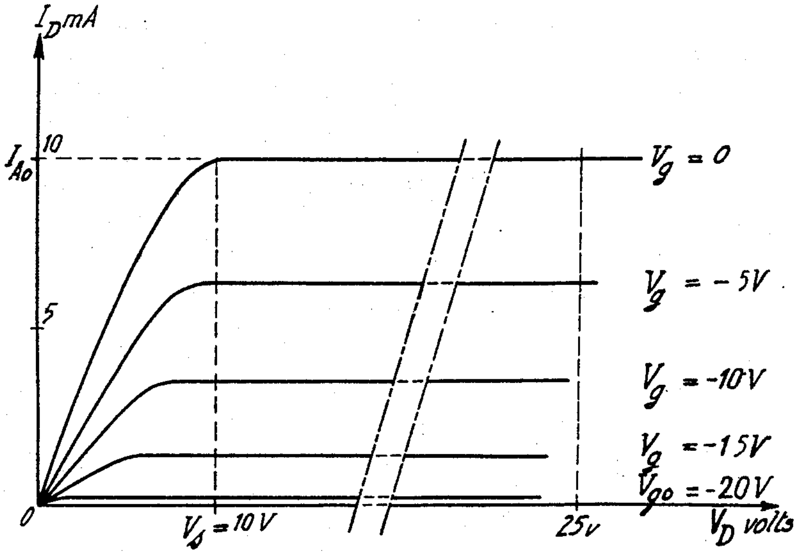
Figure 6:
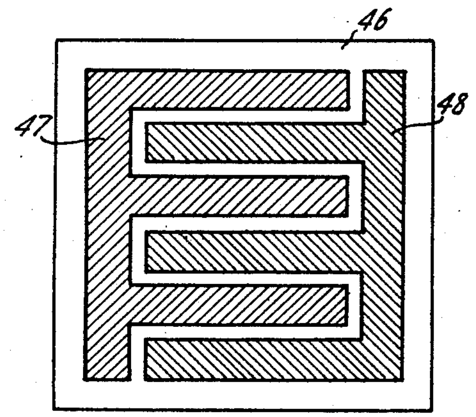

The invention will now be described in detail with reference to the accompanying drawings, in which:

FIGS. 1 and 2 show prior art mesa-type field-effect transistors having a diffused layer;

FIGS. 3*a* and 3*b* show mesa-type field-effect transistors having a diffused layer, in accordance with the invention;

FIG. 4 shows a family of curves for drain current vs drain voltage for the transistors of the invention;

FIGS. 5*a* and 5*b* illustrate an embodiment of a transistor of the invention, in which the ohmic electrodes are respectively circular and annular; and FIG. 6 illustrates another embodiment of the ohmic electrodes.

FIG. 1 illustrates a mesa-type field-effect transistor described in the French Patent No. 1,147,153 of March 1, 1956, issued to the Western Electric Company.

On one of the faces of the type P germanium plate 1 there is formed a thin outer layer 2 of type N, by arsenic diffusion for example. At two points on layer 2 there are provided, by fusing an alloy of gold-antimony, two ohmic contacts 3 and 4, which constitute the source electrode and the drain electrode of the transistor. Between electrodes 3 and 4 there is provided, by fusing aluminium, an outer zone 5 of type P, which constitutes the gate. There are also shown a polarizing source 6 for the gate, a drain feed current source 7, a signal source 8, and a load resistor 9.

The conductive channel extends between source electrode 3 and drain electrode 4, and the space charge extends from gate electrode 5 towards and up to the plane of junction 10 between plate 1 and layer 2.

The useful length of the conductive channel is determined by the length of the gate electrode in the direction of the channel connecting the source 3 to the drain 4. Regions 11 and 12, which are located between the drain and source electrodes and upon which the gate has no effect, introduce an indesirable series resistance. Moreover, the maximum drain voltage is governed by the punch through voltage of the parallel plane P-N-P transistor formed by diffused layer 2, electrode 5 and plate 1. Experience demonstrates that in transistors of this type the pinch-off potential is less than or about 10 volts. As already said the invention aims at the omission of gate 5.

FIG. 2 shows a mesa-type field-effect transistor described in the French Patent No. 1,195,298 of December 11, 1957, issued to the Société N.V. Philips Gloeilampenfabriken.

On one of the faces of type-P germanium plate 13 there is an ohmic electrode 14 and on the other face there is formed, by diffusion, an outer region 15 of type N, having a thickness $w$. Two ohmic contacts 16 and 17 are provided by an electrolytic process, without subsequent alloying, region 15 being obtained by diffusion in such a way that the resistivity at the surface be sufficiently small so that said ohmic contacts can be formed by simple electrolysis. Therefore, the resistivity gradient increases from the plane of contact between 13 and 15 towards the surface of the diffused layer 15. Reference numerals 6–9 refer to the same elements that they do in FIG. 1. Diffused layer 15 is reduced in thickness between the two ohmic electrodes 16 and 17 by a groove 18 having a gap-width of $l$ which is equal to the separation between the ohmic electrodes. In accordance with the cited patent, the following inequality must be satisfied:

$$25\mu<l<2w \quad (1)$$

This inequality requires diffusion thicknesses of considerable extent, of at least 12.5$\mu$. To lay down a thick layer by diffusion requires an appreciable length of time and lowers the quality of the monocrystal by reducing the lifetime of the minority carriers.

The conductive channel extends between the two ohmic electrodes 16 and 17; and the space charge is produced between the gate, which here is the junction plane 20 and the bottom of groove 18. The useful length of the conductive channel is determined by the length of the bottom of groove 18 parallel to plane 20. The zones 19 and 19' (which are approximately parallel to the lateral walls of the groove) of the conducting path introduce a parasitic series resistance.

As has been previously pointed out, a mesa-type field-effect transistor according to the invention has neither the gate electrode 5 of the transistor of FIG. 1 nor the groove 18 of the transistor of FIG. 2. Moreover, the distance of separation between the source and the drain is substantially equal to and preferably nearly smaller than the thickness of the diffused layer and said distance is taken equal to or smaller than $$\frac{E_1K}{P_f}$$

where $E_1$ is the critical field and $P_f$ the charge density in order that the carriers will reach the critical drift velocity with a voltage less than or at most equal to the pinch-off voltage.

Referring to FIGS. 3*a* and 3*b*, the transistor of the invention includes a plate 21 of N-type silicon, which is a compensated monocrystal, having an ohmic electrode 25 on one of its faces and a P-type diffused outer layer 22 on the other.

On layer 22 there are two ohmic electrodes 23 and 24 constituting the source and the drain, obtained not by electrolytic deposition on a portion of the outer surface having a small resistivity, but by evaporation in a vacuum, as will be seen from the description of the method for fabricating these transistors. The separation *l* between electrodes 23 and 24 is substantially equal to the thickness of the diffused layer.

Layer 22 of type P is obtained either by exodiffusion or by epitaxy the two latter methods being preferred since they allow a layer resistivity much higher than that of plate 21 to be obtained, which layer resistivity increases from the junction plane 26 between 21 and 22 towards the outer surface of 22.

The successive steps of the method for fabricating a transistor will be given with regard to a germanium transistor obtained by exodiffusion process.

A N-type compensated germanium monocrystal having, for example, a resistivity of about 0.5 ohm cm. is heated to a high temperature in the presence of a sink for the impurity such as a vacuum or cold trap. Since the donor impurities in germanium diffuse more rapidly throughout the surface than do the acceptor impurities, one obtains at the surface a P-type layer having a resistivity which increases from the junction plane towards the outer surface, the resistivity being anywhere in the outer layer greater than that of the plate. The thickness and the surface resistance of the diffused layer can be varied by dissolving the layer for germanium in a solution of sodium hypochlorite, the concentration of sodium hypochlorite being determined for obtaining a very slow dissolving action of germanium, one-tenth of a micron per minute for example, and for silicon in a mixture of hydrogen peroxide at 110 volumes and ammonium fluoride. By way of example, the thickness of the diffused layer is between 0.5 and 10 microns and its resistivity between 15 and 20 ohms cms.

The P-type layer may also be obtained by epitaxial growth. How to obtain epitaxial layers of germanium or silicon having one type of conductivity on germanium or silicon of another type of conductivity is described in a group of articles that appeared in I. B. M. Journal of Research and Development, vol. 4, No. 3, July 1960. The fundamental article of this group is that by J. C. Marinace, entitled "Epitaxial Vapor Growth of Ge Single Crystals in a Closed-Cycle Process," pages 248–255. The orders of the size of the thickness and of the resistivity of the layer are the same as in the preceding case.

The ohmic electrodes on the diffused layer are made, in the two cases, by evaporating in a vacuum. Due to the very small distance which separates the opposite edges of the source and drain electrodes, the depositing of the electrodes must be made without alloying, because the two edges of the alloyed portions may possibly make contact with each other. One can successively evaporate in vacuo two metals, the first giving well adhering layers on the semiconductor body and the second well adhering layers on layers of the first and allowing connection soldering to be made by the so-called thermocompression process. French Patent No. 1,246,813 filed October 10, 1959, discloses the production of ohmic contacts on silicon and germanium bodies by evaporating first a layer of chromium, secondly a layer of gold, the semiconductor body being maintained at a temperature of 250° C.

The whole area of both source and drain is deposited at a time and the layer is then separated into two parts by scoring or scratching with a diamond and subsequently chemically treated. Being given the very small separation of the two ohmic electrodes, it is necessary that the ohmic deposit does not alloy with the semiconductor body because the electrical continuity of the two alloyed portions will remain below the surface, and it would be necessary to hollow-out the scratch which separates the two parts.

The metallic deposit is scratched with a diamond in the shape of a pyramid, for instance, a KOOP diamond working in the direction of the longest diagonal. Experiment demonstrates that the width of the scratch made by a diamond in the shape of a pyramid having a square base into the metallized surface of a semiconductor, depends, for a given semiconductor, on the force applied to said diamond. In the case where the metalized surfaces are a double layer of chromium and gold, a force of 5 grams produces a scratch of 0.8 $\mu$ wide, a force of 10 grams a scratch of 1 $\mu$, a force of 16 grams a scratch of 1.3 $\mu$, and a force of 32 grams a scratch of 2.3 $\mu$.

A suitable force having been determined by trial, the metalized sample is moved, with respect to the diamond, by appropriate mechanical means so as to permit drawing on said sample a scratch of the desired shape. The scratch obtained has the same width and depth along its entire length.

Because with this method it is possible to obtain a scratch having a width less than one micron, one can obtain an undesired electrical continuity between the two electrodes after passage of the diamond. This continuity is eliminated when the metal chips remaining in the scratch are removed by a chemical reaction which does not directly attack the metallic deposit but only attacks the semiconductor below. The metallic chips can then be mechanically swept away by washing. In the case of P-type silicon transistors having a N-type diffused layer, the following treatment is employed. The transistor is immersed for 15 seconds in aqua regia diluted four to one, rinsed in water, then immersed for two seconds in a Dash reagent 1.1.5 (FH at 50%, 10 cm.$^3$; $NO_3H$, 10 cm.$^3$; $CH_3CO_2H$, 50 cm.$^3$), and finally rinsed in water and acetone.

In FIGS. 5*a* and 5*b*, one electrode 43, is in the form of a circle and the other electrode in the form of a ring 44. In FIG. 6, transistor 46 has two ohmic electrodes 47 and 48 in the form of a comb, the teeth of the two combs meshing. In the case of FIGS. 5*a*, 5*b* and 6, the separation of the electrodes is substantially equal to or not very less than the layer thickness.

It should be said that electrode structures forming an interlace as in FIG. 6 are known in the prior art for field-effect transistors; but in the prior art one of the interlaced electrodes has a rectifying contact for producing a field-effect on the conductive channel in the semiconductor body, and on each side of said rectifying electrode is an ohmic electrode interlaced with said rectifying electrode. On the contrary, in the invention the meshed electrodes are only two and are always ohmic.

By way of information, some characteristics of a field-effect transistor of the embodiment of FIGS. 3*a* and 3*b* are given.

Semiconductor: P-type silicon with a N-type layer.
Surface of each ohmic electrode, 170$\mu$ x 50$\mu$.
Thickness of the diffused layer, 5$\mu$.
Gap between source and drain, 5$\mu$.
Transconductance, 1.4 mA. per volt.
Saturation voltage, 10 volts.
Saturation current for $V_g=0$ (such current depends upon the size of the layer crosswise the conductive channel), 10 milliamperes.
Maximum useable frequency, 300 mc./s.

The voltage-current curves of this transistor are represented in FIG. 4.

What we claim is:

1. A mesa-type field-effect transistor comprising a body of a semiconductor material of a given resistivity in a given conductivity type, a layer of the opposite type of conductivity on said body and forming a junction therewith, said layer having a given thickness and a resistivity substantially greater than said given resistivity of said body, a first ohmic electrode on the surface of the body not covered by said layer, second and third ohmic electrodes on said layer having two parallel edges, the gap between said edges being substantially equal to said given thickness of said layer, first means for producing into said layer between said parallel edges an electric field having the critical value for which the mobile conduction carriers reach their limiting drift velocity, said first means comprising means for applying a given voltage between said second and third ohmic electrodes and second means for developing through said junction into said layer a space-charge region extending substantially into the whole thickness of said layer between said parallel edges, said second means comprising means for applying a bias voltage to said first ohmic electrode and means for applying a signal voltage between said first and second ohmic electrodes.

2. A mesa-type field-effect transistor comprising a body of a semiconductor material of a given resistivity in a given conductivity type, a layer of the opposite type of conductivity on said body and forming a junction therewith, said layer having a given thickness, a resistivity substantially greater than said given resistivity of said body and a resistivity gradient increasing from the junction to the clear surface of the layer, a first ohmic electrode on the surface of the body not covered by said layer, second and third ohmic electrodes on said layer having two parallel edges, the gap between said edges being substantially equal to said given thickness of said layer, first means for producing into said layer between said parallel edges, an electric field having the critical value for which the mobile conduction carriers reach their limiting drift velocity, said first means comprising means for applying a given voltage between said second and third ohmic electrodes and second means for developing through said junction into said layer a space-charge region extending substantially into the whole thickness of said layer between said parallel edges, said second means comprising means for applying a bias voltage to said first ohmic electrode and means for applying a signal voltage between said first and second ohmic electrodes.

3. A mesa-type field-effect transistor comprising a body of a semiconductor material of a given resistivity in a given conductivity type, an epitaxial grown layer of the opposite type of conductivity on said body and forming a junction therewith, said layer having given thickness, a resistivity substantially greater than said given resistivity of said body and a resistivity gradient increasing from the junction to the clear surface of the layer, first ohmic electrode on the surface of the body not covered by said layer, second and third ohmic electrodes on said layer having two parallel edges, the gap between said edges being substantially equal to said given thickness of said layer, first means for producing into said layer between said parallel edges, an electric field having the critical value for which the mobile conduction carriers reach their limiting drift velocity, said first means comprising means for applying a given voltage between said second and third ohmic electrodes and second means for developing through said junction into said layer a space-charge region extending substantially into the whole thickness of said layer between said parallel edges, said second means comprising means for applying a bias voltage to said first ohmic electrode and means for applying a signal voltage between said first and second ohmic electrodes.

4. A mesa-type field-effect transistor comprising body of a semiconductor material of a given resistivity in a given coductivity type, an exodiffusion produced layer of the opposite type of conductivity on said body and forming a junction therewith, said layer having a given thickness, a resistivity substantially greater than said given resistivity of said body and a resistivity gradient increasing from the junction to the clear surface of the layer, a first ohmic electrode on the surface of the body not covered by said layer, second and third ohmic electrodes on said layer having two parallel edges, the gap between said edges being substantially equal to said given thickness of said layer, first means for producing into said layer between said parallel edges, an electric field having the critical value for which the mobile conduction carriers reach their limiting drift velocity, said first means comprising means for applying a given voltage between said second and third ohmic electrodes and second means for developing through said junction into said layer a space-charge region extending substantially into the whole thickness of said layer between said parallel edges, said second means comprising means for applying a bias voltage to said first ohmic electrode and means for applying a signal voltage between said first and second ohmic electrodes.

References Cited by the Examiner

UNITED STATES PATENTS

| | | | |
|---|---|---|---|
| 2,750,542 | 6/60 | Armstrong | 317—235 |
| 2,816,847 | 12/57 | Shockley | 317—234 X |
| 2,936,425 | 5/60 | Shockley | 317—235 |

DAVID J. GALVIN, *Primary Examiner.*

JAMES D. KALLAM, *Examiner.*